(12) United States Patent
Leonard

(10) Patent No.: US 6,996,120 B2
(45) Date of Patent: Feb. 7, 2006

(54) METHODS FOR IMPROVING BUS PERFORMANCE AND BANDWIDTH UTILIZATION OF A PARALLEL BUS LAN

(75) Inventor: Martin Eugene Leonard, Hollister, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 834 days.

(21) Appl. No.: 09/809,457

(22) Filed: Mar. 14, 2001

(65) Prior Publication Data

US 2003/0007501 A1    Jan. 9, 2003

(51) Int. Cl.
*H04J 3/02* (2006.01)
*G06F 12/00* (2006.01)

(52) U.S. Cl. ..................... 370/462; 710/242
(58) Field of Classification Search ........... 370/447, 370/461, 462, 412, 414; 710/119–122, 240–242
See application file for complete search history.

(56) References Cited

U.S. PATENT DOCUMENTS

| | | | | |
|---|---|---|---|---|
| 4,375,639 A | * | 3/1983 | Johnson, Jr. ............. | 340/825.5 |
| 4,470,112 A | * | 9/1984 | Dimmick ................. | 710/116 |
| 4,488,218 A | * | 12/1984 | Grimes .................... | 710/116 |
| 4,631,534 A | * | 12/1986 | Franklin et al. .......... | 340/825.5 |
| 4,656,627 A | * | 4/1987 | Hasley et al. ............ | 370/438 |
| 5,058,051 A | * | 10/1991 | Brooks .................... | 711/167 |
| 6,002,675 A | * | 12/1999 | Ben-Michael et al. .... | 370/315 |
| 6,629,178 B1 | * | 9/2003 | Smith ...................... | 710/240 |
| 6,654,838 B1 | * | 11/2003 | Leonard ................... | 710/240 |
| 6,701,399 B1 | * | 3/2004 | Brown ..................... | 710/114 |
| 6,782,457 B2 | * | 8/2004 | Hill et al. ................. | 711/158 |

* cited by examiner

*Primary Examiner*—Hassan Kizou
*Assistant Examiner*—Hong Sol Cho

(57) ABSTRACT

Methods for improving bus performance and bandwidth utilization in a Local Area Network (LAN) are disclosed along with methods fo adapting LANs for use with differing hardware interfaces. The LANs described are based on a parallel bus architecture. Performance superiority is gained by passing data between ports on parallel circuits that individually are relatively slow, but that, in the aggregate, provide bandwidth equivalent to or greater than serial LAN's of much higher frequency. The bandwidth advantage of the parallel architecture is extended by the logical advantage which permits efficient utilization of up to 99% of this bandwidth. This logical advantage rests in the capability of establishing glare and collision avoidance schemes that result in very little wasted bandwidth. The LANs described are adapted for use with differing hardware interfaces when provided with a plurality of bus ports, where each port has associated therewith a configurable hardware interface.

13 Claims, 2 Drawing Sheets

METHODS FOR IMPROVING BUS PERFORMANCE AND BANDWIDTH UTILIZATION OF A PARALLEL BUS LAN

BACKGROUND OF THE INVENTION

1. Field of the Invention

The invention relates to methods for improving the performance and bandwidth utilization of a local area network (LAN). More particularly the invention relates to glare and collision avoidance bus arbitration techniques used to maximize the performance and bandwidth utilization of a parallel bus LAN.

2. Brief Description of the Prior Art

Current LAN's are primarily of two types: token ring and Ethernet(TM). Both token ring and Ethernet require specific hardware to be installed into the terminal stations (PC's, Printers, etc.) in order to access the network. The networks are connected as logical rings or a single bus and follow a serial data protocol throughout the network. The presently preferred and most popular network is the Ethernet network.

Ethernet is basically a serial link protocol. It can be implemented in twisted pair wiring, coaxial cable, or glass fiber (FDDI). All cabling must be terminated at each end with an Ethernet transceiver adapter. It operates using broadcast technology, whereby each station transmits in a serial manner and is received simultaneously by all other stations on the immediate network. The transceivers implement carrier-sense multiple access with collision detection (CSMA/CD) technology. Ethernet frames are between 46 and 1500 bytes. Physical connection of Ethernet stations can be from Station to Station, or the network can be connected via a central hub. The stations can detect when the carrier is being used and back off to avoid collision. When a collision is detected by a transceiver, it invokes a back-off algorithm, which causes the transceiver to wait a random period of time before attempting another broadcast on the network.

Although it is virtually the industry standard, Ethernet has several disadvantages:

Studies have shown that during periods of heavy traffic, utilization of the Ethernet can fall to 40% or less of the available bandwidth.

Ethernet requires compatibility of all stations in both hardware and protocol in order for the stations to access the network. For PC's this means an Ethernet compatible NIC (Network Interface Card).

Ethernet requires a dedicated medium (coax, twisted pair, etc.) in order for a station to access the network.

Ethernet hubs are limited in the number of ports that they can accept. Expansion means replacing the hub with a hub of larger capacity or adding another hub, either of which may result in unused capacity.

Bandwidth is limited to the discrete values established by the industry (e.g. 10 k, 100 k, and 1,000 k). To achieve higher bandwidth more and more exotic and expensive technology will be required.

SUMMARY OF THE INVENTION

It is therefore an object of the invention to provide a local area network.

It is also an object of the invention to provide a local area network which is efficient even under heavy usage.

It is another object of the invention to provide a local area network which is adaptable to different hardware interfaces.

It is yet another object of the invention to provide local area network which does not require a dedicated medium for each station coupled to the network.

It is another object of the invention to provide a local area network which is readily expandable to accommodate more users.

It is still another object of the invention to provide a local area network which has a broadly selectable bandwidth.

In accord with these objects which will be discussed in detail below, the local area network according to the invention is based on a parallel bus having n×8 data lines, ±power lines, and a clock line. The bandwidth of the LAN is the product of the number of data lines times the clock speed. Bandwidth is therefore scalable by increasing either the clock speed, the number of data lines, or both. Access to the bus is provided via ports which include transceivers, a clock receiver, and a configurable hardware interface.

According to the presently preferred embodiment of a port, one transceiver is provided for each data line and two FIFO buffers are provided in each port, one buffer for transmitting and one for receiving. According to the presently preferred embodiment, eight data lines are provided and each FIFO buffer is 2 kilobytes deep.

Access to the bus is provided in a repeating variable length frame, a portion of which is dedicated to bidding for access to the bus. Each port is assigned an address based on a data line and a clock cycle. Bidding takes place during the first p clock cycles of the frame, where p is the number of data ports divided by the number of data lines, rounded to the next highest integer. For example, for 20 ports and 8 data lines, p=20/8=2.5, rounded to 3. Following bidding, the bidders' addresses are placed in a queue in order of priority of ports.

Before data is transmitted, the message length is transmitted during clock cycle p+1 and the destination address is transmitted during clock cycle p+2. The destination port may refuse the transmission during clock cycle p+3. If the transmission is not refused, data is transmitted during clock cycles p+4 through p+4+n/b where n is less than or equal to the size of the buffers in bytes and b is the byte width of the data bus. Buffer bytes are written during a final timeslot p+4+n/b+1 where the message length is not evenly divisible by the byte width of the data bus.

The network of the invention becomes more efficient as usage increases. Because the queuing system employed is offline, ports govern themselves in respect to bus access and there is no unseemly crowding for control when a port has relinquished use of the bus. Bidding is done in a calm and dignified manner, with the port having the highest priority allowed to use the bus whenever two or more ports bid for access.

External stations can be of any nature. The interface ports that are plugged into the LAN will each be unique to the station to which it is linked. This means there can be ports that accept 19.6 Kbaud serial links and ports that accept 100 Mbaud Ethernet links. Since a 10 Megahertz 16 bit bus has a bandwidth of 160 megabaud, such an implementation can easily accept 100 Mbaud Ethernet ports.

The ports of the parallel bus LAN can accept any medium. Any electronic data that can be converted into digital form can be passed over the LAN. It is only necessary to design an interface port to do the conversion. This means, among other things, that networks can be developed that use ADSL technology to implement high speed data connectivity across the existing telephone infrastructure with no impact on the voice switching network.

The parallel bus LAN can be designed as a relatively inexpensive backbone capable of accepting a large number of ports. The flexibility of the design leads to almost limitless numbers of configurations involving bus frequency, bus width, port types, etc. Bandwidth is virtually unlimited. The parallel bus LAN can be expanded to any practical width and any practical frequency. For example, a bus that is 64 bits wide running at a clock speed of 100 MHz, has a bandwidth of 6.4 Gigabaud. This is easily achievable with existing technology. The individual stations continue to operate at whatever baud rate their existing ports are capable of. But with the parallel bus LAN, the network bandwidth can be so increased that delays due to heavy usage will virtually disappear.

DETAILED DESCRIPTION

Figure 1:
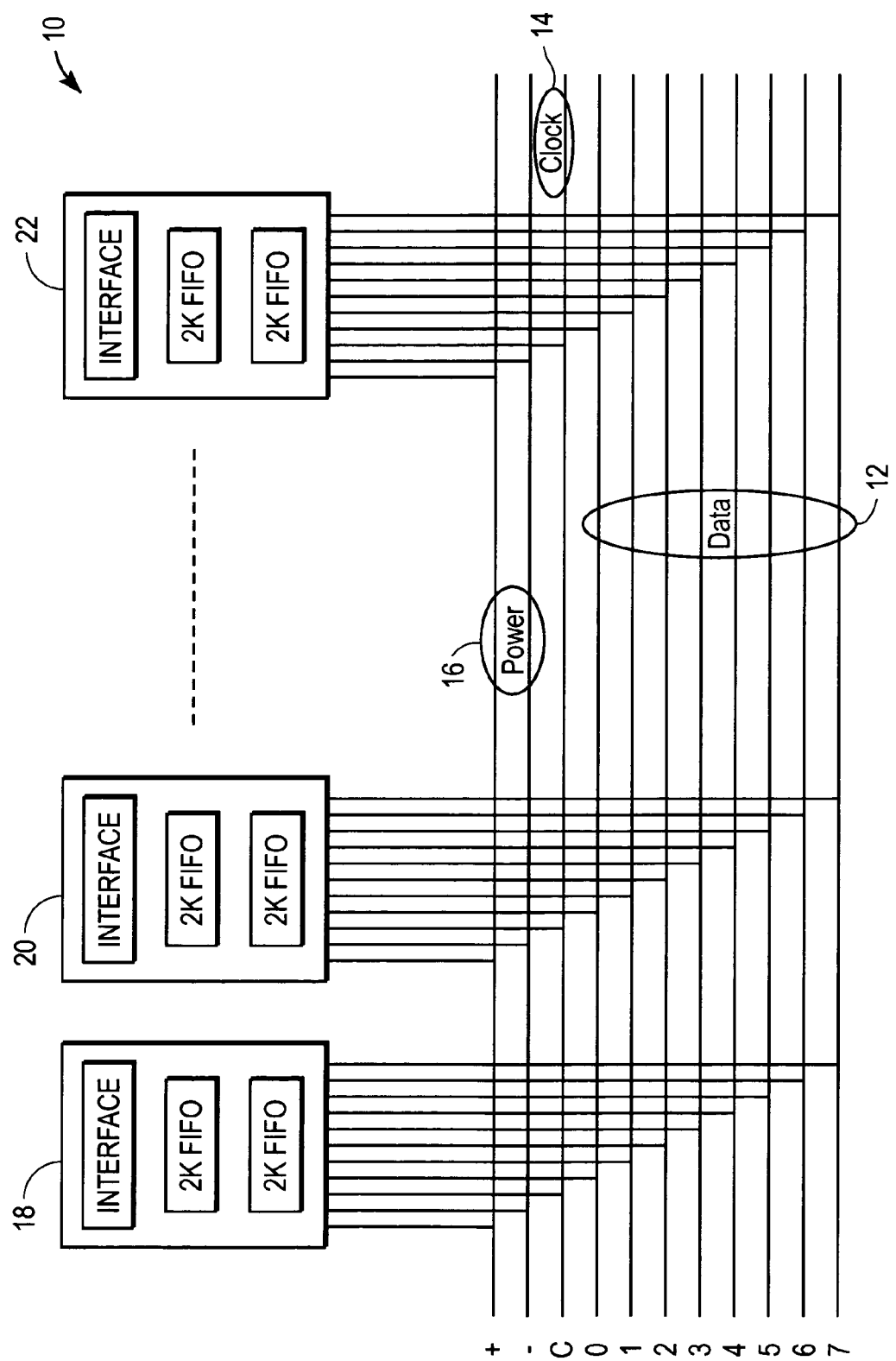
FIG. 1 is a high level schematic diagram of a parallel bus LAN according to the invention.

Turning now to FIG. 1, a parallel bus LAN 10 according to the invention includes a data bus 12, a clock bus 14, a power bus 16 and a plurality of users or "ports" 18, 20, 22. According to the invention, the data bus 12 has n*8 data lines and each port includes a transceiver for each data line. According to the presently preferred embodiment, each port includes two FIFO buffers (preferably 2 KB each), one for incoming data and one for outgoing data, and a hardware interface. According to a preferred aspect of the invention, each port has a hardware interface which is adapted specifically for a particular piece of hardware. For example, the hardware interface may be a serial port link, an Ethernet port link, a USB port link, a FireWire(TM) port link, etc.

Figure 2:
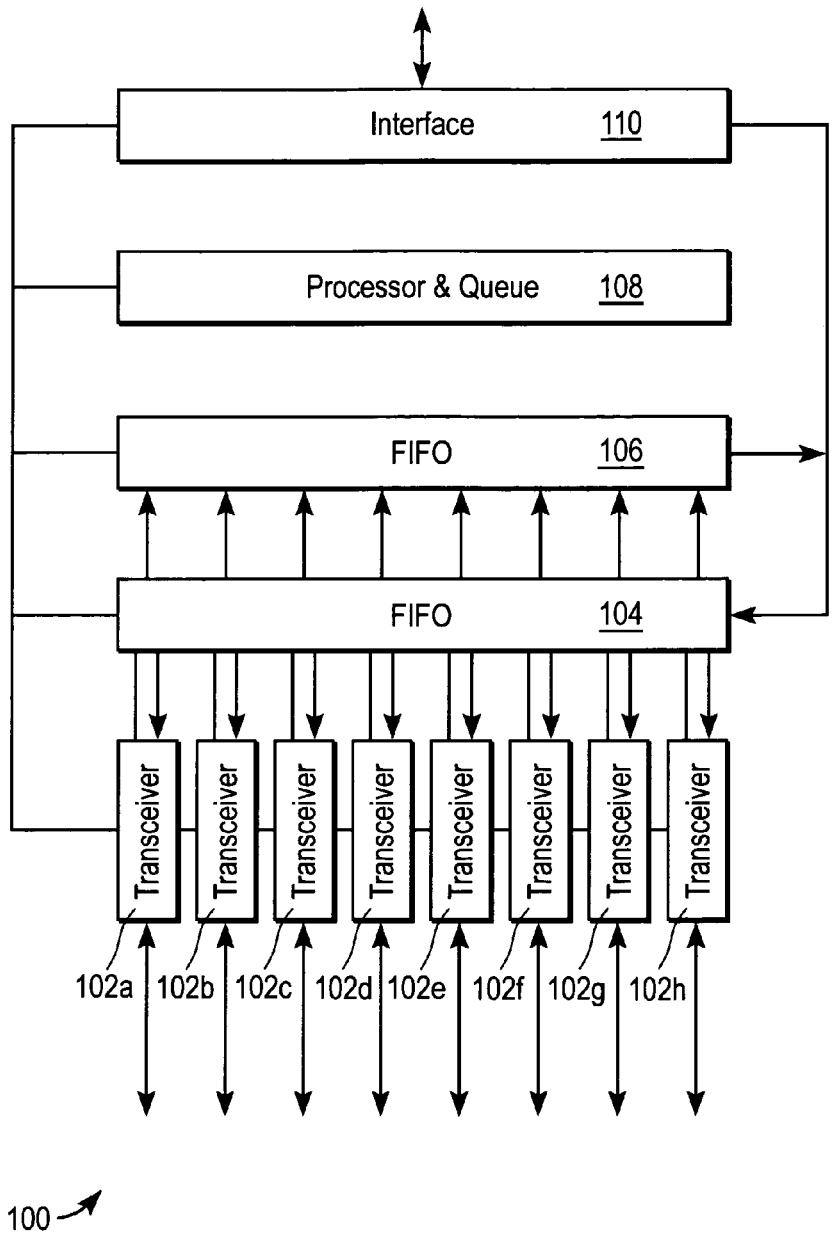
FIG. 2 is a high level schematic diagram of a bus port according to the invention.

Referring now to FIG. 2, an exemplary embodiment of a port 100 according to the invention includes a plurality of transceivers 102a–102h, one for each bit of the data bus, an output FIFO 104, an input FIFO 106, a processor with output queue 108 and a hardware interface 110. As shown in FIG. 2, the processor is coupled to all of the other components so as to control the flow of data to and from the bus. The interface 110 supplies data to the output FIFO 104 and receives data from the input FIFO 106. Both FIFOs are coupled to the transceivers which are coupled to the bus.

According to the invention, data is placed on the bus in a repeating, variable length, frame having the format shown in Table 1.

TABLE 1

| Clock cycle | Data Bus Content |
| --- | --- |
| 1 | Bit mapped bids |
| ※ | Bit mapped bids |
| P | Bit mapped bids |
| P+1 | Message length |
| P+2 | Destination Address |
| P+3 | Port busy |
| P+4 | Data |
| ※ | Data |
| P+4+n/b | Data |
| P+4+n/b+1 | Data + Buffer bits |

Each port is assigned an address based on a data line and a clock cycle as described in more detail below with reference to Table 2. Bidding takes place during the first p clock cycles of the frame, where p is the number of data ports divided by the number of data lines, rounded to the next highest integer. For example, for 20 ports and 8 data lines, p=20/8=2.5, rounded to 3. Following bidding, the bidders' addresses are placed in a queue in order of priority of ports. All ports monitor the bus. Each port maintains a copy of the queue and writes to the bus in turn based on the queue. The queue contains the addresses of the ports that have unsuccessfully bid for the bus and are waiting for an opportunity to send a message. Ports are allowed to take possession of the bus in the order in which they placed their bids. When glare occurs (two ports bid at the same time), the lower number address(higher priority) port receives the earlier position in the queue.

Before data is transmitted, the message length is transmitted during clock cycle p+1 and the destination address is transmitted during clock cycle p+2. The destination port may refuse the transmission during clock cycle p+3. The transmitting port turns off its transmitters during the BUSY timeslot (p+3) to permit the destination port a chance to refuse the message.

An address value is the decimal value assigned to the destination port. Ports read this address during the p+2 clock cycle and accept data from the bus when the address is their own. If a port's buffer space is not sufficient for the message length, it will place a 0 on all the bits of the bus at the time of the BUSY timeslot in order to refuse the incoming message. In this case, the transmitting station truncates the message, places an EOM code on the bus and bids again. The port wishing to transmit continues to attempt to transmit (via bidding and transmission) until the receiving station is able to accept the message.

If the transmission is not refused, data is transmitted during clock cycles p+4 through p+4+n/b where n is less than or equal to the size of the buffers in bytes and b is the byte width of the data bus. Buffer bytes are written during a final timeslot p+4+n/b+1 where the message length is not evenly divisible by the byte width of the data bus. If the queue is not empty at the end of a message, the bidding process is skipped and the next port in the queue takes possession of the bus following the buffer byte(s).

Bidding is the process whereby a port expresses its intention of taking possession of the data bus for the purpose of transmitting a message to one or more other ports. A port wishing to send a message, places a 0 voltage on the bus on ALL bit positions for one timeslot to signal the beginning of a frame. Then it places a 0 voltage on the line corresponding to its bit position at the time of its byte position. If, for example an 8 bit bus LAN is designed for 64 ports, the first 8 bytes of a frame are dedicated to the bidding effort. Together, these bytes compose a bid chart. Each bit of a byte represents a particular port, determined by the value of that port's pre-assigned port number (from 1 to 64) as shown in Table 2. The formula to determine a port's bit position is (port number/8)=byte number and the remainder = bit number. If the bus width is some multiple of eight, the formula doesn't change, although the timeslot location of the bit may change.

TABLE 2

| | Bit 7 | Bit 6 | Bit 5 | Bit 4 | Bit 3 | Bit 2 | Bit 1 | Bit 0 |
| --- | --- | --- | --- | --- | --- | --- | --- | --- |
| Byte | Port | Port | Port | Port | Port | Port | Port | Port |
| 0 | 7 | 6 | 5 | 4 | 3 | 2 | 1 | 0 |
| 1 | 15 | 14 | 13 | 12 | 11 | 10 | 9 | 8 |
| 2 | 23 | 22 | 21 | 20 | 19 | 18 | 17 | 16 |

TABLE 2-continued

|   | Bit 7 | Bit 6 | Bit 5 | Bit 4 | Bit 3 | Bit 2 | Bit 1 | Bit 0 |
|---|---|---|---|---|---|---|---|---|
| 3 | 31 | 30 | 29 | 28 | 27 | 26 | 25 | 24 |
| 4 | 39 | 38 | 37 | 36 | 35 | 34 | 33 | 32 |
| 5 | 47 | 46 | 45 | 44 | 43 | 42 | 41 | 40 |
| 6 | 55 | 54 | 53 | 52 | 51 | 50 | 49 | 48 |
| 7 | 63 | 62 | 61 | 60 | 59 | 58 | 57 | 56 |

The parallel bus LAN according to the invention allows the implementation of a true "star" LAN configuration which interfaces between two or more serial communication links. It provides a medium for serial links of disparate hardware types running at disparate speeds to exchange digital information without loss of data integrity and without suffering significant delays. In conjunction with the logical architecture described above, the LAN provides a physical interconnecting hub of scaleable bandwidth and minimal overhead with the versatility to meet almost any networking situation.

The parallel bus LAN of the invention permits use of existing wiring infrastructure in a high speed data network, especially for, but not limited to, the telephony network. It provides highly efficient use of the network bandwidth and an elegant solution to heavy traffic situations. There is no possibility of any particular port losing out in contention arbitration. The LAN has the versatility to be implemented in very inexpensive hardware in applications where current technology would be prohibitively expensive or in state of the art technology to give performance untouched by any existing LAN.

There have been described and illustrated herein a parallel bus LAN and an arbitration protocol for use therewith. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method of arbitrating access to a bus having a plurality of ports, said method comprising the steps of:
    assigning each port a unique address which defines a unique priority value;
    generating a repeating, variable length frame;
    bidding for access to the bus during at least one predefined clock cycle of the frame;
    granting access to the bidding port having the highest priority; and
    placing the other bidding port addresses in a queue.

2. A method according to claim 1, wherein each port maintains a copy of the queue.

3. A method according to claim 1, wherein bidding is only permitted when the queue is empty.

4. A method according to claim 1, wherein at least one cycle of the frame is reserved for transmission of message length, at least one cycle is reserved for transmission of destination address, and at least one cycle is reserved for the port having the destination address to assert a busy signal on the data bus.

5. A method according to claim 4, further comprising the steps of:
    the port having access to the data bus transmitting a message length during the message length cycle of the frame; and
    the port having access to the data bus transmitting a destination address during the destination address cycle of the frame.

6. A method according to claim 5, further comprising the steps of:
    the port having the destination address asserting the busy signal during the busy cycle of the frame; and
    the port attempting to transmit to the busy port repeating bidding until the message is sent.

7. A method for improving bus performance and bandwidth utilization in a parallel bus LAN, said method comprising the steps of:
    providing a parallel bus LAN having a plurality of data lines and a dock bus; and
    avoiding data collisions by implementing, during a portion of a variable length time frame, a bidding arbitration scheme such that only one bus user can transmit on the bus at one time, the bidding arbitration scheme assigning each port a unique address which defines a unique priority value, wherein access is granted to a port having the highest priority and wherein the other port addresses are placed in a queue, each port maintaining a copy of the queue.

8. A method according to claim 7, further comprising the step of increasing the number of data lines and/or the frequency of the clock bus to increase the bandwidth of the LAN.

9. A method according to claim 7, further comprising the step of avoiding glare by assigning a priority to each bus user and granting access to the bus to the highest priority user when two or more users simultaneously bid for bus access.

10. A method according to claim 7, each port having a configurable hardware interface.

11. A method for improving bus performance and bandwidth utilization in a parallel bus LAN, said method comprising the steps of:
    providing a parallel bus LAN having a plurality of data lines and a clock bus; and
    providing a plurality of bus ports, each bus part having a configurable hardware interface to thereby enable the LAN to be adapted for use with differing hardware interfaces; and
    avoiding data collisions by implementing, during a portion of a variable length time frame, a bidding arbitration scheme such that only one bus user can transmit on the bus at one time, the bidding arbitration scheme assigning each port a unique address which defines a unique priority value, wherein access is granted to a port having the highest priority and wherein the other port addresses are placed in a queue, each port maintaining a copy of the queue.

12. A method according to claim 11, further comprising the step of avoiding glare by assigning a priority to each bus user and granting access to the bus to the highest priority user when two or more users simultaneously bid for bus access.

13. A method according to claim 11, further comprising the step of increasing the number of data lines and/or the frequency of the clock bus to increase the bandwidth of the LAN.

* * * * *